United States Patent [19]

Alvarez

[11] 4,317,119
[45] Feb. 23, 1982

[54] STAND ALONE COLLISION AVOIDANCE SYSTEM

[76] Inventor: Luis W. Alvarez, 131 Southampton Ave., Berkeley, Calif. 94907

[21] Appl. No.: 102,803

[22] Filed: Dec. 12, 1979

[51] Int. Cl.$^3$ ............................................... G01S 3/38
[52] U.S. Cl. ........................ 343/112 CA; 343/100 SA
[58] Field of Search ................. 343/100 SA, 112 CA, 343/9, 705

[56] References Cited

U.S. PATENT DOCUMENTS

| | | | |
|---|---|---|---|
| 2,713,161 | 7/1955 | Fiske | 343/100 SA |
| 3,052,882 | 9/1962 | Pidhayny et al. | 343/112 CA X |
| 3,134,975 | 5/1964 | Goodman | 343/112 CA X |
| 3,364,484 | 1/1968 | Best | 343/100 SA X |
| 3,500,303 | 3/1970 | Johnson | 343/100 SA X |
| 3,714,651 | 1/1973 | Lyon | 343/100 SA X |
| 3,825,928 | 7/1974 | Williams | 343/100 SA X |
| 3,833,904 | 9/1974 | Gebhardt et al. | 343/100 SA X |
| 3,864,689 | 2/1975 | Young | 343/100 SA X |

*Primary Examiner*—T. H. Tubbesing
*Attorney, Agent, or Firm*—Townsend & Townsend

[57] ABSTRACT

A stand alone collision avoidance system is disclosed for mounting to a large passenger jet especially to avoid the collision problem common to such large jets colliding with small propeller driven aircraft. A bistatic radar antenna system is disclosed having a frequency in the range of 40 Giga Hertz (hereafter GHz). Paired bistatic antennas are used with each couplet of bistatic transmitting and receiving antennas searching one quadrant of a total forward hemisphere of search in the direction of plane travel. Paired transmitter antennas, one for each quadrant, are typically located above and below the nose located weather radar and are mechanically scanned side to side in the typical "beaver tail" scan with the beaver tail occupying 100° of elevation and 0.71° of beam width. Paired receiving antennas, again one for each quadrant, are located with one such antenna on the leading edge of the vertical stabilizer or tail and the other antenna on a special mast lowered in a position where landing gear shadow does not obscure forward view. Each receiving antenna is mechanically scanned side to side synchronously with its transmitter antenna and consists of a phased array with a vertical scan generated from about 500 discrete linearly disposed receiving elements for vertical resolution of up to 0.21°. The antenna is responsive only to radar return signals approaching the antenna in a narrow vertical angular range, at some desired, and variable, vertical angle.

10 Claims, 11 Drawing Figures

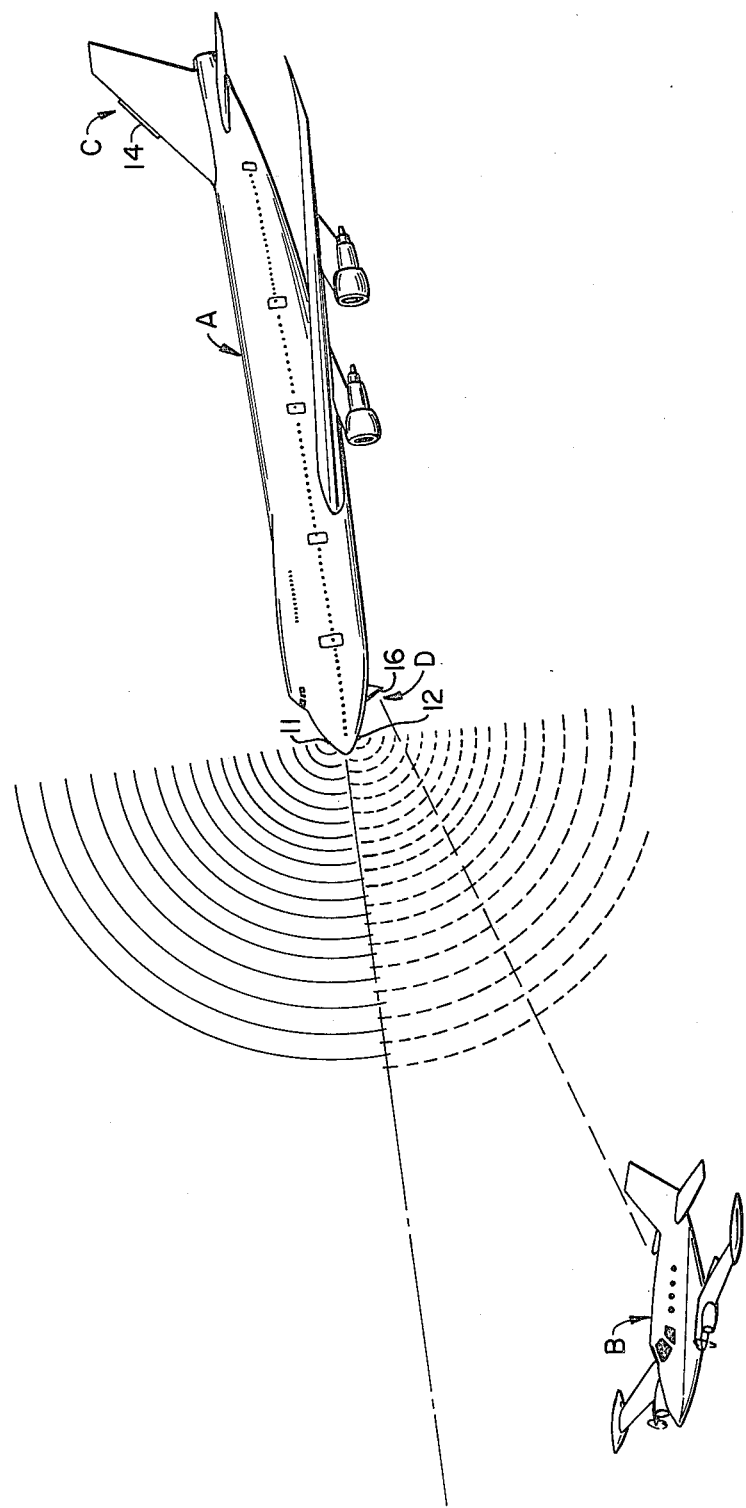
FIG._1A.

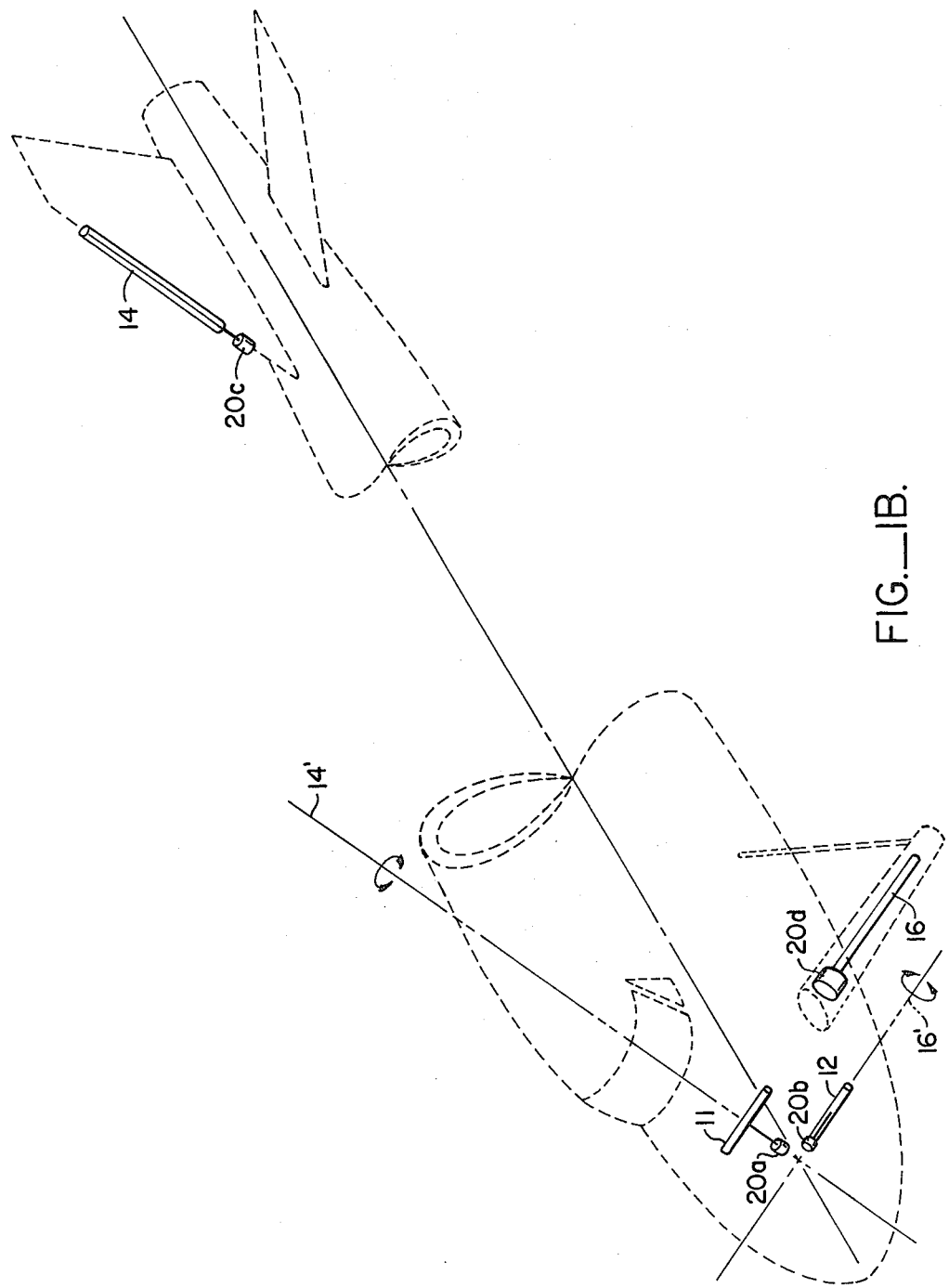
FIG._1B.

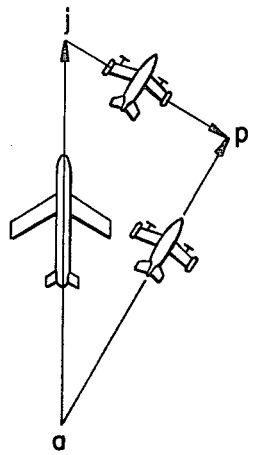
FIG._2A.
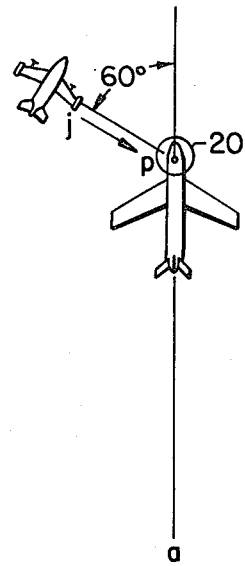
FIG._2B.
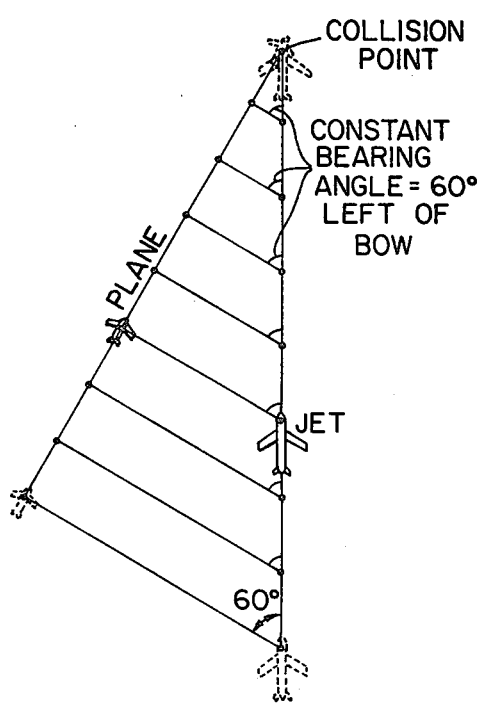
FIG._2C.
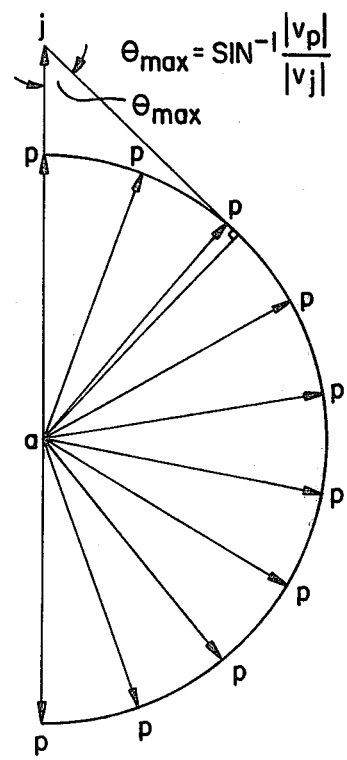
FIG._3.

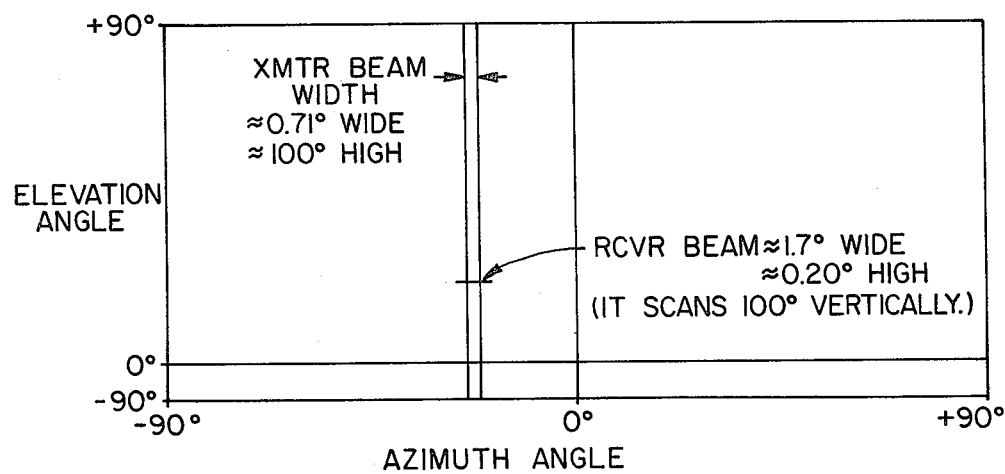
FIG._4A.
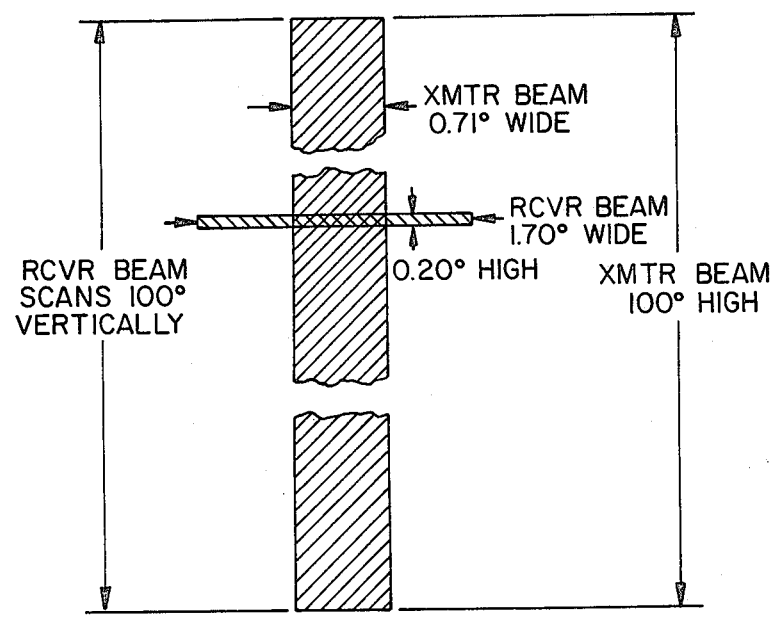
FIG._4B.

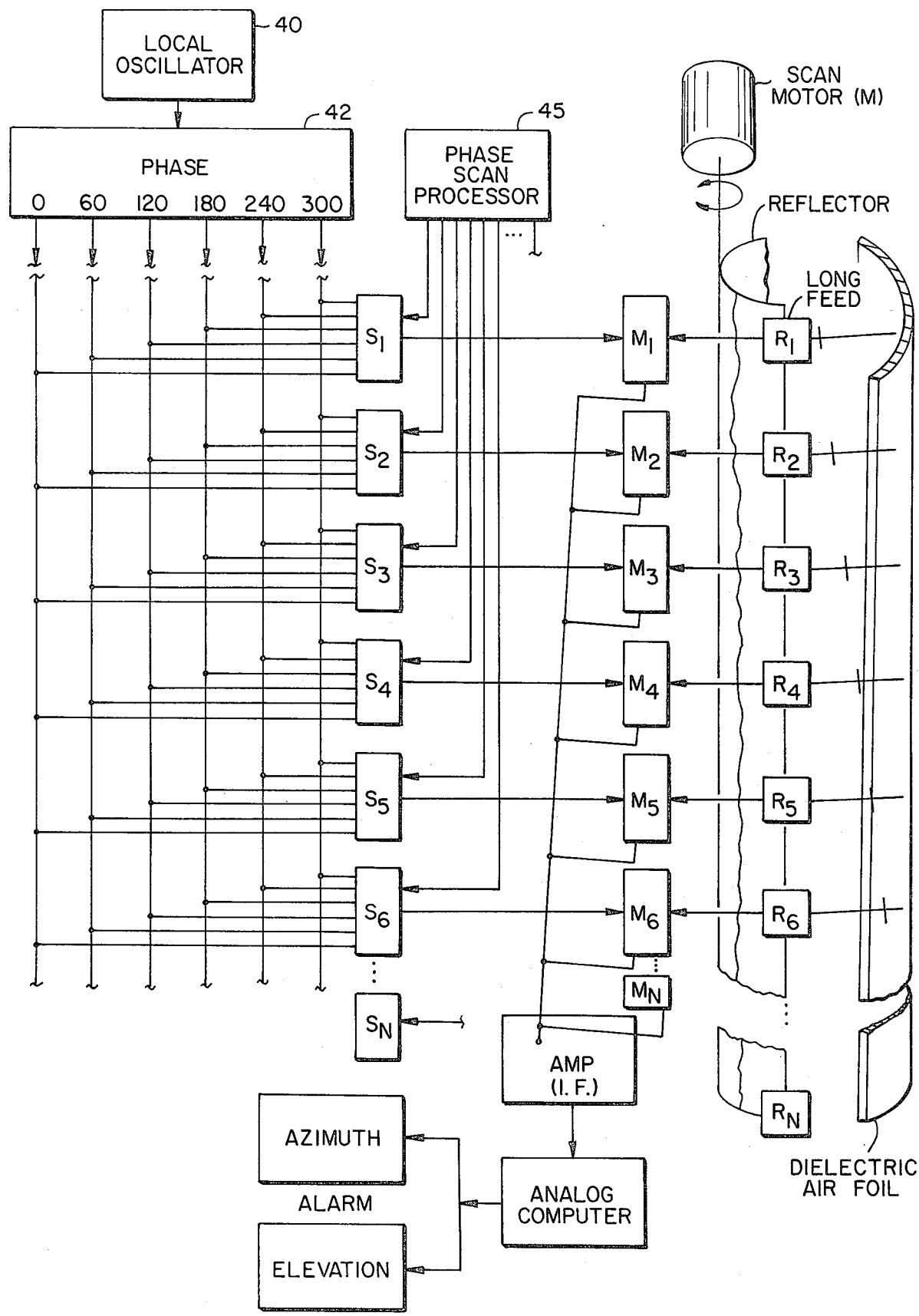
FIG._5.

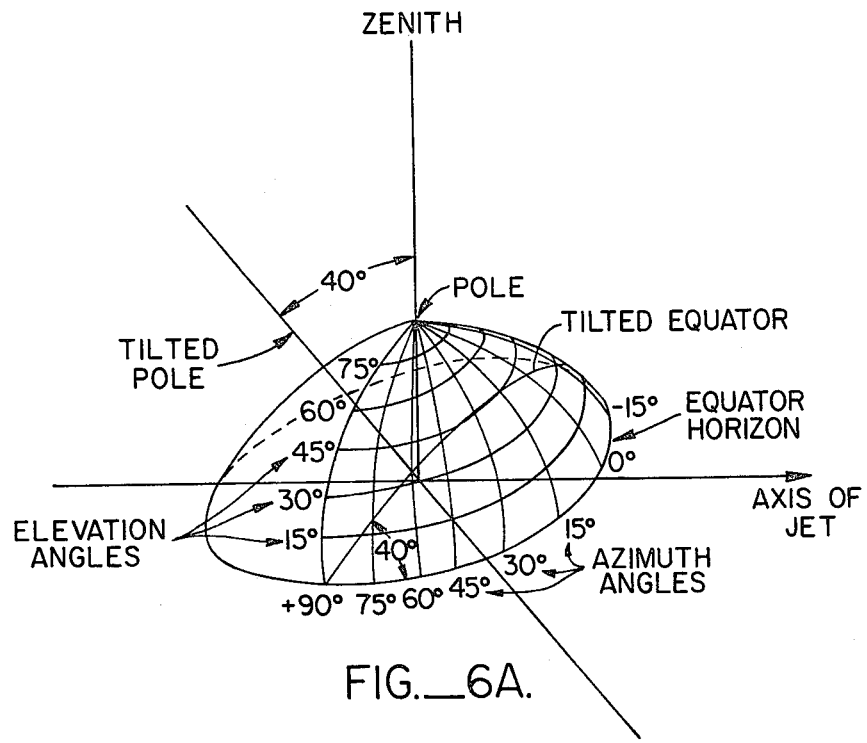
FIG._6A.
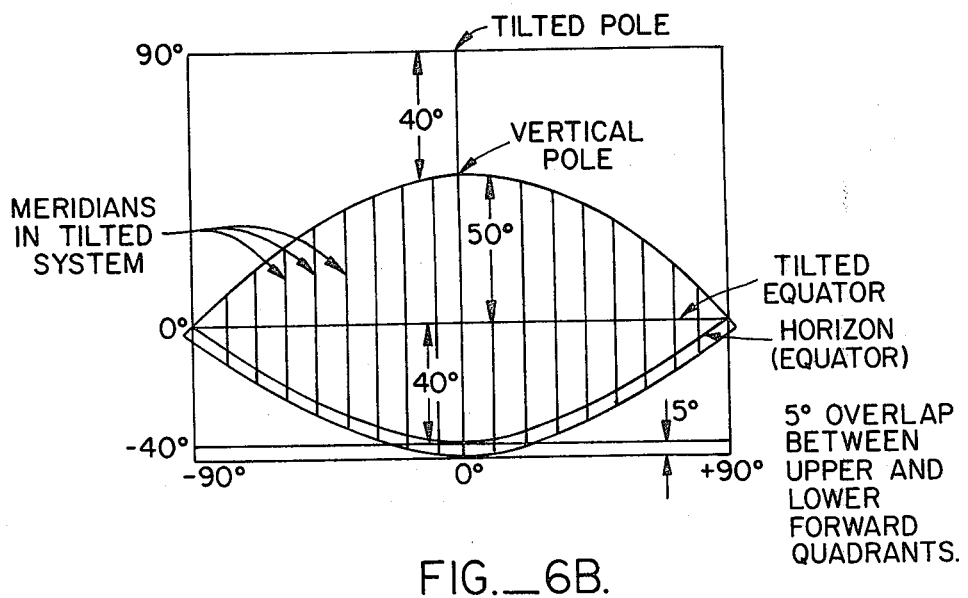
FIG._6B.

STAND ALONE COLLISION AVOIDANCE SYSTEM

This invention relates to a stand alone collision avoidance system for aircraft, preferably of the large jet type.

SUMMARY OF THE PRIOR ART

Aircraft have heretofore been equipped with radar for seeing large turbulent cells in clouds along the path of flight of the aircraft. Unfortunately, such weather radar lacks sufficient angular resolution to see the approach of other aircraft. Specifically, there is so much return from the side lobes of the searching beam, that the approaching aircraft are typically lost in the "ground clutter" of such radar.

The problem of detecting airplanes in ground clutter is one which I have had to face and solve, when I was designing GCA (Ground Controlled Approach), in 1942. The solution lay in a very tall phased array (14 feet high) working at the X band (3 cm. wavelength). The vertical beamwidth was $\lambda/a = 3$ cm/30 cm per foot $\times 14$ ft $= 7.14 \times 10^{-3}$ rad $= 0.40$ degrees. The fan beam was 0.40 degrees high, and about 3.5° wide, and it scanned through a vertical angle of 7°. A similar phased array that I designed for the X band blind bombing radar set called Eagle, scanned ±30° from the normal to the horizontal array, which was 16 ft long. (U.S. Pat. No. 2,480,208).

Systems aimed at the prevention of midair collision have been specifically proposed. These systems have included very accurate clocks, all of which clocks pulse from each aircraft at the exact instant in time. By monitoring and looking for a non-changing time to collision from an approaching beacon, collision can theoretically be avoided.

Unfortunately, in such systems expensive clocks of extreme accuracy were required to be mounted to all aircraft. Moreover, the detecting system of each aircraft relies on the accuracy of clocks mounted in all other aircraft.

Likewise, transponders and the like have been proposed. Unfortunately, all these systems suffer from lack of accurate altitude information. For example, where barometric altitude is relied upon, the inaccurate altimeter response and reading causes inaccuracy rendering collision information which is erroneous.

All cooperative systems include one major inherent difficulty. Failure of the system on one plane renders even those aircraft with otherwise fully operable system unprotected. There results a factor of unreliability in cooperative systems which cannot be controlled by one aircraft owner. Stand alone systems are therefore to be preferred.

To date, no stand alone collision avoidance system which is self-sufficient has been proposed or installed on aircraft.

STATEMENT OF THE PROBLEM

The reader is cautioned that the following section relating to the statement of the problem constitutes part of the invention hereof. It goes without saying that recognizing the specific problem to be solved can constitute invention, and the reader will understand the specifics of the problem generated and the recognition of the parameters of the problem are part of my invention.

Current flight rules addressed to the interface between the large jet aircraft flying about 200 knots and light (propeller) planes traveling at less than 156 knots and more often on the order of 100 knots require "seeing and being seen". Collision is most likely after takeoff or before landing as the jet passes through those altitudes where such light aircraft fly. Consequently, at the very moments when lookout for possible collision should be intensified, the flight crews of such jets are otherwise well occupied in the mechanics of approach and departure from crowded airports.

Familiarity with the vector analysis of collision relative velocities (hereinafter disclosed) illustrates that the relative bearing of planes on collision courses remains unchanged while the range closes. It is interesting to note that the human eye has evolved to suppress images that are not in the fovea unless the images angular bearing is changing. The human eye is exceedingly acute when looking straight ahead, that is when the fovea of the retina is centered on the object. Where, however, the object is displaced from the fovea, the eye cannot detect the object easily unless the angular bearing is changing. This is an extraordinary property of the eye that is not widely known, but is an apparent product or our evolution. Clearly, our ancestors who did not have this remarkable sensitivity to movement in the "peripheral field" were eliminated by catastrophes which "blind sided" them (to use as American football term).

Thus, where the pilot's fovea is not centered on an aircraft on a collision course, the concept of "seeing and being seen" fails in just those cases where we want it to work best. This is where two planes are on collision course and therefore approaching each other from a fixed and unchanging bearing or direction relative to an aircraft cockpit.

Ground control designation of planes on collision course has not been without problems. First, ground controllers have no way to accurately determine altitude. Altitude is measured barometrically, and relayed to the controllers in "quantized steps". Ground control can therefore only warn pilots of impending collision when gross altitudes of the two collision candidates are approximately the same and the plan position indicators of ground control radar plot show by extrapolation that there may be a coincidence of the flight paths. Consequently, collision warnings to pilots are more often than not false alarms, because planes that appear to collide, on the radar scopes, actually pass one directly above the other, in three dimensional space. A natural complacency thus develops.

Requiring all aircraft to carry collision avoidance instrumentation has political limitations. With half a million private aircraft in the country, expensive accessories for collision avoidance cannot as a practical matter be forced on a politically unacceptable segment of the flying population. Likewise, dedication of flight corridors between different types of aircraft meets similar resistance, and is technologically unenforceable. Even assuming solution to the political problem, collision can still occur where aircraft fly out of designated corridors.

Since large jet aircraft are typically under instrument flight rules, incidents of collision between such jet aircraft have been of recent rare. Consequently, the device here disclosed is tailored especially to the large aircraft-small aircraft collision interface. Instrument flight rules separation with consequent collision avoidance on the part of jet aircraft is at all times assumed.

Finally, my analysis of the large approach angle for some possible collisions indicate that it is possible when the planes fly in roughly the same direction that the relative angle of collision can be generated well outside of the present solid angle of pilot view of all aircraft. Consequently, and in the absence of supplemental instrumentation, many times there is no way that pilots can follow the "see and be seen" rule as the aircraft fuselage at other than window areas completely blocks the view during certain collision courses.

SUMMARY OF THE INVENTION

A stand alone collision avoidance system is disclosed for mounting to a large passenger jet to especially avoid the collision problem common to such large jets colliding with small propeller driven aircraft. A bistatic radar antenna system is disclosed having a frequency in the range of 40 Giga Hertz (hereafter GHz). Paired bistatic antennas are used with each couplet of bistatic transmitting and receiving antennas searching one quadrant of a total forward hemisphere of search in the direction of plane travel. Paired transmitter antennas, one of each quadrant, are typically located above and below the nose located weather radar and are mechanically scanned side to side in the typical "beaver tail" scan with the beaver tail occupying 100° of elevation and 0.71° of beam width. Paired receiving antennas, again one for each quadrant, are located with one such antenna on the leading edge of the vertical stabilizer or tail and the other antenna on a special mast lowered in a position where landing gear shadow does not obscure foward view. Each receiving antenna is mechanically scanned side to side synchronously with the corresponding transmitter antenna and consists of a phased array with a vertical scan generated from about 500 discrete linearly disposed receiving elements tuned for an up and down resolution of up to 0.21°. These receiving elements have desired phase shift provided by a phase shift in the local oscillator frequency supplied to discrete mixers incorporated in a super heterodyne mode. Resultant data can be processed for an unchanging time to collision parameter or more accurately for a constant (double) bearing-closing range solution. All contacts by the radar are effectively ignored, save and except for those passing the collision course parameters. Indication of collision course candidates are provided on an alarm basis with bearings in elevation and azimuth indicated to the pilot for collision avoidance. Provision is made for on the ground runway scan with radar display on weather radar CRT's to avoid low visibility take-off and landing collisions.

OTHER OBJECTS, FEATURES AND ADVANTAGES

An object of this invention is to disclose a stand alone collision avoidance system for preferable mounting to large jet aircraft. According to this aspect, bistatic radar antennas examine the forward hemisphere of air space in the path of the plane out to a distance of approximately 10 kilometers. Returning radar echoes are received and processed. Collision candidates only are indicated to the plane crew on an alarm basis. At least 40 seconds warning of a contact in bearing and elevation relative to the cockpit can be provided an aircraft crew to forewarn collision.

An advantage of the disclosed system is that nothing need be included on other small (propeller driven) aircraft to make the system work. Rather, by either the original fit or retrofit of the disclosed radar to a large jet, collisions can be avoided.

Another object of this invention is to disclose a radar with improved angular resolution defined to the point where small aircraft can be distinguished from the background "clutter". According to this aspect, an airborne radar is disclosed having a frequency in the order of 40 GHz and a wavelength in the order of 7.5 millimeters. Respective transmitting and receiving patterns are generated orthogonally with the overlap therebetween defining an extremely narrow two dimensional effective beam pattern, that scans in raster fashion over an upper or lower forward quadrant. By analyzing return signals for collision candidates only, alarm in advance of collision can be provided.

An advantage of this aspect of the invention is that small aircraft close to the ground can be distinguished. For example, a large aircraft in a tilted up or approach flight attitude can for the first time be warned of collisions outside of the otherwise obstructed solid angle of pilot view (especially below the aircraft nose).

A further advantage of this invention is that the disclosed wavelength and frequency is chosen to have a typical atmospheric absorption which is negligible for the required short range radar solution necessary for avoidance of collision. For example, a maximum, and negligible, signal attenuation of 0.8 db of the radar signal over a round trip distance of 20 kilometers is in the order of that attenuation which can be expected.

A further object of this invention is to conform high resolution radar antennas to the flight surfaces of an aircraft so that the antennas may be mounted to the aircraft without substantially altering its flight characteristics. According to this aspect of the invention, a bistatic radar antenna is utilized. Horizontally disposed transmitters for generating vertically aligned beaver tail sweeps are typically mounted in the nose of the aircraft above and below the weather radar location. One transmitting antenna transmits to the upper forward quadrant of flight space. The other lower transmitting antenna transmits to the lower forward quadrant of flight space. Separate receiving antenna pairs are mounted to the aircraft, one for each transmitting antenna. The forward upper quadrant return signal is picked up by a receiving antenna mounted to the leading edge of the aircraft tail at an elevation sufficient to avoid a fuselage shadow of the intended solid angle of reception. The forward lower quadrant return signal is picked up by a receiving antenna mounted to a specially lowered fairing. The disclosed antenna system is capable of utilizing the shortest possible wavelength with the longest possible antenna, to generate the highest angular resolution all without interfering with or appreciably altering the flight characteristics of large aircraft.

An advantage of the disposition of the receiving radar antennas is that an exceptionally thin beam reception window can be generated. For example, in the vertical direction angular discrimination on the order of 0.20° can be achieved while in the horizontal direction angular discrimination on the order of 0.7° of a degree can be achieved.

A further advantage of the disclosed radar antenna system is that the radar may thus be mounted either as new equipment to jet aircraft of new manufacture or can be conveniently provided as retrofit equipment to older inservice aircraft.

A further object of this invention is to tailor the radar search made to the solid angle of view required to avoid the large jet aircraft/small (propeller) aircraft collisions. According to this aspect, I have determined that the collision angle to be anticipated can be no greater than the arc sine of the ratio of speed between the aircraft constituting the collision candidates. Thus for most normal collision incidents where a jet can collide with propeller driven aircraft, a cone described about the jet aircraft flight path at an angle extending from the cockpit of approximately 60° describes the solid angle of the air space which must be observed for collision.

An advantage of the collision analysis parameters set forth is that as the aircraft approach one another at angles towards the fringes of the examined cone, relative speeds decrease. Consequently, angular resolution of the radar towards the cone fringes can be intentionally degraded, along with antenna gain, to ease antenna design parameters.

A further object of this invention is to disclose a collision avoidance system that has utility in ground take-off and landing situations where runway visibility is close to zero. According to this aspect of the invention, provision can be made for the display on weather radar CRT's, of the received radar pictures of the runway. By observing, while on the ground, the weather radar CRT, other aircraft on the same airport surface area can be detected in zero visibility situations. Advice from air traffic controllers on low visibility runway clearance can thus be verified. Thus collisions with aircraft on the same runway, or on intersecting runways can be avoided by direct action on the part of the aircrew, irrespective of incomplete or faulty information supplied from the tower.

An advantage of this aspect of the invention is that the weather radar display, normally useless during take-off and landing, can be utilized as an additional tool for flight safety.

A further object of this invention is to disclose a bistatic radar system, transmitter and display which bistatic system examines the upper and lower overlapping quadrants for collision treats. According to this aspect of the invention, a first bistatic transmitter antenna is mounted in the nose of the aircraft above the weather radar. This antenna broadcasts to the upper forward quadrant with an approximate 10° overlap below the horizon. The receiving antenna for the upper quadrant is typically swept at 40° to the vertical in the direction of the aircraft flight by mounting to the aircraft tail. The lower quadrant transmitting antenna is below the weather radar. Lower quadrant receiving antenna is preferably on a swept fairing lowered in the vicinity of the aircraft nose. Receiving antenna lengths are in the order of 2.8 mm long and contain approximately 500 discrete receiving elements which can be phased to permit effective antenna angular address.

An advantage of the disclosed bistatic radar antenna is that only the receiving antenna for the lower quadrant need be mounted on a special fairing. This mounting protrudes from the vicinity of the aircraft baggage compartment where space is otherwise generally available without penetrating into the occupied portions of the aircraft.

A further object of this invention is to define a preferred mode of radar scan. According to this aspect of the invention, the transmitting collision avoidance radar is scanned mechanically, side to side, at the rate of one complete scan every one or two seconds. Upper and lower receiving antennas, scanned mechanically, side to side, in synchronism with their corresponding transmitting antennas, are "electrically scanned" at a rapid rate in the "up and down" direction by appropriate "phase control" of the approximately 500 receiving elements that make up each of the two receiving phased arrays. A raster scan of the "composite beam pattern", with angular dimensions in the order of 0.71° of width and 0.2° of height is completed every one or two seconds and searches both the upper forward and lower forward quadrant completely for collision candidates.

An advantage of phasing the reception of the discrete receiving antennas is that mechanical limitations on the up and down scanning rate are avoided. Such mechanical limitations do not hamper the required side to side scanning rate, and by employing mechanical scanning in that coordinate, the antenna system is greatly simplified, and its cost greatly reduced over the situation that would be obtained if electrical (phased) scanning were used in both coordinates.

A further object of this invention is to disclose a preferred method of producing a "vertically" narrow angular beam that can be scanned electrically over a wide range of "vertical angles", by proper phase control at the local oscillator signals fed to separate mixers; each of the many receiving elements is connected permanently to its own separate mixer. According to this aspect of the invention, each of the discrete receiving antenna elements is initially mixed with the same local oscillator frequency, provided to each mixer with a computer-controlled choice of, say six different phases. By appropriate computer-controlled phase switching to the mixer for each antenna element, the resultant combined intermediate frequency signal from all the interconnected mixers will contain radar signals from only a narrow vertical range of angles (0.2° high). But the vertical position of that narrow beam can be changed rapidly, over a range of about 100°, by the computer-controlled local oscillator phases at each mixer. Thereafter, the received signals are amplified at the intermediate frequency and normally processed.

An advantage of the provided phase switching is that mechanical scan in the vertical direction is avoided. A phase switched scan in the vertical direction permits the receiving array to complete a vertical raster scan line in a time interval of a hundredth of a second.

An advantage of this aspect of the invention is that microwave phase shifting of transmitted or received signals is not required, and microwave amplification of the received signal does not have to occur. Such processes are state of the art at the normal S and X band frequencies, but have not yet been achieved at the very much higher frequencies in the order of 40 GHz that are needed within stand alone collision avoidance systems to obtain the desired very narrow antenna beam widths.

Yet another object of this invention is to permit beam degradation near the fringes of the cone of search. According to this aspect of the invention, the computer can be programmed to increase the vertical width of the receiver beam, when it points farthest from the axis of the aircraft. The wider beam width means that the antenna gain is lower, so the maximum detection range is also lowered. But the closing rates for small planes at large angles are very slow, so ample warning time is provided, even though the detection range is lowered, at those large angles. Angular resolution and degradation in the order of a factor of 4 can be tolerated in the antenna design and thus facilitate system design.

A further object of this invention is to disclose a system of discrimination between those planes which are observed by the radar and not on a collision course and those which are within the tolerance parameters of the system on a "true collision course". According to this aspect of the invention the output of the radar is channeled to both a timed collision analyzer and a constant bearing closing range parameter. System observations when channeled to and analyzed by a microprocessor are displayed to the flight crew on only an alarm basis. This alarm basis informs the flight crew on a "need to know" basis of aircraft posing a serious collision threat. Consequently, the crew can devote full attention to the usually much more important tasks of aircraft landing and the like.

An advantage of this disclosed radar is that although it constitutes additional instrumentation, it does not constitute a substantial additional burden or surcharge to the already busy takeoff and landing routine of aircraft. Instead, it only sounds an alarm when an emergency is present so that catastrophe can be avoided.

Other objects, features and advantages of this invention will become more apparent after referring to the following specification and attached drawings in which:

FIG. 1a is a view of a large jet aircraft from the front thereof illustrating two paired transmitting antennas, two paired receiving antennas and the respective solid angles of view which they both examine along the forward flight path of the aircraft with a hypothetical overtaking of a small (propeller) aircraft being schematically shown;

FIG. 1b is an illustration of each of the two transmitting antennas and each of the two receiving antennas with their respective radomes and fuselage enclosures shown in broken lines;

FIGS. 2a-2c are vector diagrams illustrating the problem of large jet/small (propeller) driven aircraft and the possible collision between them;

FIG. 3 is a vector diagram of all possible configurations of collision between two aircraft of unequal speed which assumes that the faster aircraft carries a collision avoidance radar system in accordance with this invention;

FIGS. 4a and 4b are illustrations setting forth the generating scanning raster of the bistatic radar of this system; and, FIG. 5 is an illustration of the receiving antennae of this invention;

FIGS. 6a and 6b are diagrams illustrating a typically coordinated transformation from an orientation of the transmitting and receiving antennas to an orientation taken along the axis of plane flight.

Referring to FIG. 1a, the proposed system concentrates on two separate classes of planes—jets and propeller planes—not because of their power plants, but because (1) they fly in two quite disparate and non-overlapping speed regimes and (2) jets (both commercial and business) fly at all times under IFR (instrument flight rules), where they are adequately separated from each other by the Air Traffic Control system. The collisions we want to guard against are those of the kind where the small propeller planes are flying VFR (visual flight rules), and the jets are flying IFR (instrument flight rules). Here, the "see and be seen rule" applies, and it simply cannot be made to work with the degree of reliability we need.

None of the collision avoidance systems either proposed or in use (except for the disclosure herein) can tell whether or not the two planes concerned are on a true collision course (relative bearings in both azimuth and elevation remaining constant as they close in range), or whether they will pass simultaneously over the same point on the ground, with enough of an altitude difference to keep them from colliding. For this reason, there are too many false alarms, and pilots who are busy running down their landing check list get tired of searching for planes they are told are "at 1 o'clock—one mile", only to find the planes are hundreds of feet above or below them, and therefore of no concern. So the old parable of the boy shouting "Wolf" is applicable, and pilots can be excused for occasionally saying, "We have him (in sight)", when they have looked quickly ahead at their own altitude, and seen nothing. They may feel that they have more important things to do than search above and below altitude, for planes that (they incorrectly believe) could not possibly run into them.

The proposed system is not for preferred use at jet cruising altitudes, for two reasons: (1) the small (propeller) aircraft that are flying VFR cannot get that high, and (2) the present IFR Air Traffic Control system works so well that (to the best of my knowledge) there have been no U.S. midair collisions at cruising altitudes since the Grand Canyon event in 1956, which led to the implementation of the present system.

Ultra narrow width fan beams have heretofore been used from ground locations to sweep small solid angles. However, mounting to aircraft with wide angles of sweep has not been proposed, except for my "Eagle" blind bombing radar system, of World War II (U.S. Pat. No. 2,480,208) in which the beam was exceedingly narrow only in the horizontal direction; but very wide in the vertical direction.

Utilizing aircraft surfaces for antenna support, I am now proposing that we should use the shortest possible wavelength, and the longest possible antenna. In my opinion, the shortest possible wavelength is now 7.5 mm, instead of the 3 cm I used heretofore in GCA and Eagle. As will hereinafter appear, recurring bistatic antennas with a vertical height of more than 2 meters will be used. So the angular width of the received beam will be reduced from the 0.4° of GCA and Eagle, to 0.2° in the proposed collision avoidance system (hereinafter CAS). (The CAS employs a wavelength about 4 times smaller than the GCA and Eagle wavelength, but its antenna is roughly half as long.)

The aircraft modification here proposed is an antenna tall enough to give the received radar beam to a bistatic receiving antenna a vertical width of much less than a degree. The importance of this exceptionally "thin" beam pattern—in the vertical direction is emphasized. In my opinion, it is the single most important feature of the proposed system, and it is quite difficult or impractical to build a radar stand-alone CAS system without this "extra-thin beam".

Referring to FIG. 1a, the upper part of the leading edge of the vertical stabilizer is used to hold one of the two very long receiving antennas (14 and 16), that is tilted back about 40° from the vertical. This tail construction is common to commercial jet aircraft. The other long antenna 16 is stored in a fairing in the bottom of the aircraft during cruise, and is pushed downward into its operating position, tiled back about 40° from the vertical direction, while the aircraft is climbing to or descending from cruising altitude.

Some attention can be given to the attenuation of the wavelength (7.5 mm; 40 GHz) utilized for the collision detection.

The Radar Handbook, by M. I. Skolnik, pages 24-13, shows the attenuation of radio waves as a function of frequency, due to absorption in water vapor and oxygen. 7.5 mm waves have a frequency of 40 GHz. Their attenuation in water vapor is essentially that of X-band (10 GHz; 3 cm), and their attenuation in oxygen is greater, but of no consequence (less than 1 db) for the 18 km maximum "round trip" utilized in the proposed collision avoidance system—5 nautical miles out to the target, and 5 back.

If we think of a jet moving at 250 knots—its highest allowed airspeed below 10,000 feet—toward a light plane flying VFR in the opposite direction at 200 knots, we find the closing time from a 5 nautical mile initial detection range is 5 n.m./(200+250) knots=0.0111 hrs=40 seconds. This is more than enough time for the CAS system to evaluate the threat (using its microprocessor to compare the elevation and azimuth bearing angles on several successive antenna sweeps—at the rate of about 1 complete sweep of the forward hemisphere per two seconds). It does no good to give the pilot a longer warning time, because a plane executing a "standard rate turn" is changing its direction 3° each second. So I have assumed that one does not want to bother the flight crew with warnings of possible collision threats that would not materialize for more than 30 seconds.

The reader will appreciate that the design criteria of this kind will eventually be decided by committees with representation from many sectors of the aviation community. I only submit the maximum range as reasonable. It can be changed to meet other standards.

Referring to FIG. 1b and remembering the orientation of the receiving antennas described for FIG. 1a, the sweep of the bistatic antennas can be understood. Transmitting antenna 11 is swept by a motor 20a. This sweeping occurs about an axis 14' which is parallel to the axis of receiving antenna 14. The transmitting antenna 11 sweeps mechanically from left to right about axis 14'.

The receiving antenna 14 also sweeps from left to right along its axis through motor 20c. This sweep is synchronous. There results a simultaneous mechanical sweep of both antennas. The upper quadrant is thus continually swept by transmitting antenna 11 and receiving antenna 14. As will be understood hereafter, a rapid raster-like electrically phased vertical scanning of the receiving antenna simultaneously occurs.

The sweep of the lower quadrant is analogous. Transmitting antenna 12 is swept about an axis 16' which is parallel to the orientation of receiving antenna 16. Synchronous panning of antenna 12 through motor 20b and receiving antenna 16b through motor 20d provides for the applicable transmission and reception herein required.

In order to understand the collision avoidance properties of this invention, it is necessary to fully analyze from vector diagrams the parameters of the type of collision we are seeking to avoid.

The concept of "time to potential collision" must be understood. Time to potential collision is defined by the range (between planes), divided by the closing rate. This measurement can be made for any two planes whose range is decreasing, even when, as is generally the case, the two planes are going to miss each other by a very wide margin. If the two planes fly at constant speed and direction, and if they are on a true collision course (the elevation and azimuth bearing angle of one plane as seen by the other stay constant in time), then the predicted clock time of the collision will remain the same; as the planes approach each other and eventually collide (at the predicted clock time). But if they are not on a collision course, the clock time for the potential collision will be computed to occur later and later, in successive measurements. In the limiting case, when the planes reach their closest range, the range rate (closing velocity) is zero, so the calculated clock time of the collision is indefinitely far removed—it is calculated to take place after an infinite time delay, because the denominator of the defining fraction is zero.

The next feature of importance in the design involves the "allowed range of the two bearing angles" that a light plane can have when it is on a collision course with a jet. I will make the fundamental assumption that the true airspeed of the jet is always greater than that of the light plane. This is a most important assumption, and it in no way involves the rules that say light (propeller) planes must fly within airport traffic areas at less than 156 knots, but jets can fly up to 200 knots in those areas. I believe it is a fact that small planes will aways be flying slower than jets in any airspace, and for that reason, the maximum angle ("off the bow") that a jet must search (in azimuth) is ±90°.

I will now have to do a bit of vector analysis to show that if the maximum ratio of the air speeds of light planes and jets is r, then the maximum constant angle ("off the bow") that the light plane can approach the jet is $\sin^{-1} r$. (This assumes that r is less than 1, since no angle can have a sine larger than 1.)

FIG. 2A is a vector triangle that shows the true airspeed of the jet—a vector with a head labeled "j", and a tail labeled "a", for air. (The vector can be interpreted with the statement "this is the velocity of the jet (j) with respect to the air (a)". Similarly, there is a shorter vector labled "p" at its head, and "a" at its tail, to indicate the speed of the plane with respect to the air. By the rules of vector addition, if we make the tails of the two vectors coincide (they are both labeled "a"), we have two arrow heads, labeled "j" and "p", for jet and plane. If we connect the two arrows with a line, we have the line along which the jet or plane appears to be moving, when viewed from the plane or jet. If we move with the jet (for example, by sitting in the pilot's seat), we see the plane moving toward us along that line, with a vector velocity given by drawing the arrow head (labeled "p") in coincidence with the other arrow head labeled "p". We label the other end of the line (coincident with the arrow head labeled "j") with a j, and consider it to be the tail of the relative velocity vector. We can now "read" the new vector as the velocity of the plane with respect to the jet, with the head labeled "p", and the tail labeled "j".

FIG. 2B is the same as FIG. 2A except that the vector (pj) has been slid parallel to itself, so that its head (labeled p) now coincides with the head of the jet's velocity vector (relative to the air). We can consider the circle 20 in FIG. 2B to be the cockpit of the jet. We now see the plane approaching the jet as the jet's pilot would see it; the plane is approaching the cockpit from the "ten o'clock direction", and it appears to be flying "sideways" into the jet.

FIG. 2C shows the ground tracks of both planes, as they move into the collision. The dots on each ground track are equally spaced in time and it is clear that the plane remains at the "10:00 o'clock position". To the jet pilot, the colliding plane would of course also remain at the same apparent elevation angle; those two "constant bearing" features are the signature of a collision, and those two features (in particular the constant vertical angle) keep the proposed CAS from issuing the many false alarms that "cooperative systems" are prone to do.

The reader will understand that of necessity I have shown only two dimensions of a three dimensional collision problem. Most importantly, and where the collision candidates (the jet and the slower (propeller) aircraft) are moving at nearly the same directions, large angles of collision can be generated which are either above or below the solid angle of pilot view. In other words, collisions can occur where it is not possible to "see and be seen".

Drawing all possible relative headings for the jet and the light plane, plus all the relative velocity vectors at 20° intervals about a common course or heading for the jet is shown in FIG. 3.

We see from FIG. 3, that the maximum angle of approach of the plane, (off the bow of the jet), is $\sin^{-1} r$, where r is the ratio of the true airspeeds of plane and jet. It is clear that if r is $<1$, then r is $<90°$, and the plane can never approach the jet through its rear hemisphere. If that condition is always met, as it is when high speed jets overtake slower propeller driven aircraft, when we do not have to look in the back hemisphere, if we are a jet concerned about colliding with a light plane operating under VFR. It is interesting to look at the limiting case where $r=1$, and the plane approaches the jet at exactly 90° (off the bow). In this case, the two planes must be flying almost parallel to each other, at the same speed, in very nearly the same direction. If the courses are slightly convergent, then the plane appears (to the jet) to be moving very slowly, at right angles to its direction of flight, and it will eventually bump the side of the jet very gently.

FIG. 3 shows that the velocity of the plane, in the jet's moving coordinate system, (length of the vector labeled p and j), increases continuously as the relative heading angles of the two planes change from 0, through 90°, to 180°. Of course, when the headings are the same, the closing speed is $v_j - v_p$, and when the headings differ by 180°, the closing speed is $v_j + v_p$.

When I first drew these diagrams, I through it was safe for the jet to search through relative bearings from $+60°$, through 0, to $-60°$ (off the bow), which meant that I felt that the plane never exceeded 0.866 times the speed of the jet. But since it is easy to search through $\pm 90°$ in the forward direction, I've adopted the $\pm 90°$ scan as a design criterion, and that lets the air speed of the light plane equal that of the jet, and still assures that the jet will always see it.

Moreover, although the enclosed disclosure is not adapted to two jet aircraft traveling at the same speed, a solid angle of search including a hemisphere of search in the direction of aircraft travel covers this contingency.

We must now look at the required range of elevation angles that must be searched by the system, to find all planes whose airspeed is less than that of the jet. When I first looked into this matter, I concluded, incorrectly, that the "interesting" elevation angles (in the jet's coordinate system) extend over a much smaller range than they do in the "plan view" of FIG. 3. My misapprehension arose from an improper assessment of the fact that jets and small planes spend most of their time flying horizontally ($\phi = 0$), and never exceed certain maximum climb angles ($\phi = +\phi_{max}$), or certain descent angles, ($\phi = -\phi_{max}$).

I mention this mistake, since I believe that most people would make the same one on a first pass. But a closer look shows that just as in the plan view, the large approach angles (above or below the bow) come when the two planes are flying nearly parallel to each other, at nearly the same speed. This can happen when the two planes are flying nearly level, or when they are climbing or letting down slowly. So the fact that planes do not climb or descend at large angles to the horizontal does not restrict the "interesting elevation angles" to a range that is substantially smaller than the $\pm 90°$ we assumed had to be covered azimuthally. Moreover, it is equally important to note that such angles of collision are well outside the solid angle of pilot view found in large jet aircraft. "Seeing and being seen" simply cannot work for such collision angles.

So from now on, I will assume that the stand-alone CAS will have to detect any plane that approaches the jet in the jet's forward hemisphere.

The fact that I have never seen these last points made in my wide reading of the aviation literature makes me feel that they are not appreciated by pilots—particularly by pilots of light planes, who are most exposed to the hazard of descending slowly onto a plane below, when both are flying at about the same speed, or in having a plane descend onto them, in the same fashion. In this case, each plane is in the other's "blind spot".

The best numbers I have available for a recent large jet/small aircraft collision indicate that the jet was flying level at 150 kts, and the light plane was climbing at 78 kts, at 600 ft/minute. This makes the plane's climb angle, $\phi$, equal to 4.3°. So the plane appears to the jet pilot to be flying upwards, and nearly backwards at 71 miles per hour, from an angle of 4.7° below the horizon. But since the jet had extended its flaps and gear, it was in a pitched-up attitude (in order to fly level), and so the plane was more probably about 10° below the fore and aft axis of the jet, and it remained at that depression angle while the tower was warning.

I am now ready to describe my proposed radar installation on the jet. It has several features that distinguish it from any radar set with which I am familiar. In the first place, it is not a "monostatic system", as almost all radars are—and certainly all airborne radars that I know of are. A monostatic system uses the same antenna for both transmitting and receiving; such a system uses its antenna area most efficiently, and gives the longest range for the same transmitter power, receiver sensitivity, and total antenna area. You should then ask why I would want to revert to an old design, that uses separate transmitter and receiver antennas. The answer is simply that state of the art phased array antennas are difficult to build at 17 GHz (1.76 cm), and certainly won't be available at 30-40 GHz (1.0-0.75 cm), for many years. The present state of such antennas is described in the May and June (1978) issues of Microwaves, and it is far from adequate. In my opinion, the difficulties described in these articles have mostly to do with the fact that it is assumed that any phased array will be monostatic, with a separate, phased, solid state transmitter amplifier at each "antenna element", together with a ferrite isolator, to keep the transmitted pulse from damaging the sensitive receiver components, plus the digitally-controlled phase shifters, operating at the microwave frequency. All that circuitry must go into a package that has a cross section of $0.86 \times 0.355$ inches; those dimensions are proportional to the wavelength. So if we go from the 16.5 GHz used in this design, to the 40 GHz I am proposing, we see that the packages will have dimensions that are both smaller by the factor 16.5/40=0.41. So the 40 GHz packages would be 0.35"×0.15". And if we were to consider filling a 2.6 meter (104") by 25 cm (10") area with such elements, to make our scannable array, we would need about 20,000 elements in the upper antenna, and an equal number in the lower antenna. At a bargain price of $100 per unit, the price of the antennas would be $4 million. I think that anyone with experience with phased arrays would say that such an object could not be installed on an airplane in the next ten years, and even if it could be developed more rapidly, it could not be sold at a price that anyone would pay to receive its protection.

We get a great advantage if we use the phased array for a single function, for example, for receiving only, and further, if we "phase scan" it only in the vertical direction, and use mechanical scanning in the horizontal direction. (We are allowed about 2 seconds for the horizontal scanning cycle, and that is a very reasonable rate for a mechanically oriented object.) We need the phased scan in the vertical direction for several reasons, that will be apparent at once to any radar designer. We cannot use the mechanically phased GCA-Eagle array, because it could only scan a few times per second, and our CAS vertical antenna must scan through 110° of elevation in about a hundredth of a second.

The basics of the bistatic radar system proposed will now be described. In fact it is a pair of bistatic radars C and D, one protecting the upper forward quadrant, and the other the lower forward quadrant. The two systems overlap by 5 or 10 degrees in their elevation coverage, near the horizon (see FIG. 1a). Referring to FIG. 1b, each long, phased receiving array is tilted back about 40° from the vertical. Both transmitting and receiving antennas scan azimuthally from −90° to +90°, by mechanically turning from left to right, and then suddenly returning to the left, to scan again. Motors 20a-20d provide the drive. The two transmitting antennas are mounted in a radome at the front of the jet, one above the weather radar antenna, and the other below it. The upper and lower transmitting antennas are horizontally disposed and scan in azimuth only, by mechanical motion, about an axis parallel to their associated receiving antenna. The pattern of the transmitting antenna is wide in the vertical direction, and narrow in the horizontal direction; the suggested dimensions of the transmitter "horn" or "pillbox" radiators are 2 feet horizontally, and 5 mm vertically. The vertical fan of radiation would extend from below the horizon to beyond the vertical, so it would illuminate all targets that could be viewed by the rapidly scanning receiver fan beam, which is narrow vertically, and relatively wide horizontally. The 2 foot (60 cm) wide transmitting antenna would confine the beam to an azimuthal width of $\pi/a = 0.75/60 = 0.0125$ rad = 0.71°. As will hereinafter be more fully apparent receiving antennas 14, 16 also scan electronically by a phase scan in the order of one hundredth of a second per vertical line. FIGS. 4a and 4b show the angular dimensions of the transmit and receive fan beams, and how their overlapped area defines the equivalent "pencil beam" of the radar system.

The overlapped "pencil beam" is 0.20° high by 0.71° wide.

It may at first sight seem that the antennas in this radar system are oriented at very strange angles, but if they were tilted back another 5° from the 40° that Boeing uses on its vertical stabilizers, to 45° from the vertical (top and bottom), the antenna arrangement would look remarkably like the ones on the largest U.S. nuclear carrier, the Enterprise. That system surrounds the carrier's "island", and consists of 4 large panels of phased arrays, arranged as the vertical sides of a cube. If we consider only two of those adjacent phased arrays, we see that their planes are oriented 90° to each other in azimuth, and they cover somewhat more than a hemisphere of possible targets. So if our two CAS phased arrays were inclined to each other by 90°, rather than the 80° that I have assumed in this design, the geometry of the Enterprise radar system and that of the CAS would be identical to each other in one respect. The Enterprise system scans electronically in both azimuth and elevation, whereas the CAS system scans electronically in elevation, but mechanically in azimuth.

Now that I have demonstrated that this system is not as strange as it first looked, I will now calculate something about the number of "looks" it takes to "fill in" the solid angle there is in the quadrant of the sky that each bistatic radar system must search. FIGS. 4a and 4b show that the effective beam is 0.20° high by 0.71° wide, so its solid angle is $0.20 \times 0.71/57 \times 57 = 4.4 \times 10^{-5}$ steradian. Since there are $\pi$ steradians in a quadrant, it would take $\pi/4.4 \times 10^{-5} = 7.2 \times 10^4$ "looks" to search that full quadrant—if the beam solid angle stayed constant at all search angles. (And since I have suggested that the upper and lower quadrants overlap a bit, I will increase the required solid angle to encompass $9 \times 10^4$ looks).

We know that we do not always need the exceedingly fine angular resolution that dictated the antenna design in the first place. In fact, we need that resolution only when we are looking approximately straight ahead, for planes at 5 nautical miles, that are coming straight toward us. We need the higher resolution of the beam to (1) see these targets when they would normally be lost in the ground clutter, and (2) to concentrate the beam, and therefore make the signal to noise ratio larger at the extreme range. Our analysis of the vector diagrams and the much slower closing rates that correspond to planes approaching at large angles "off the bow" (or above and below it) shows that we can very much increase the beam solid angle when looking away from the axis of the jet. This is because (1) we do not need nearly as great a maxmimum detecting range at such angles—the closing rates are so much slower at large angles of approach that we have more than the desired 40 seconds, even when the detection range is low, and (2) we do not need the angular resolution to separate the plane signals from the ground clutter—that function is taken over by the radar pulse length. (In fact, we would have to degrade our angular resolution very severely before it became just as good as some of the best airborne radars ever built prior to this one. So we have a very large factor to exploit, in this respect).

I calculate that I do not have quite enough time to complete a scan of a quadrant in the 2 seconds I have alloted to that function—if I keep the beam at its narrowest at all times. But I have plenty of time if I let the beam widen at the larger angles, as military phased array radars normally do. If we deactivate half the array, the beam doubles in width along that direction. And of course with microprocessor control of the array as hereinafter set forth, we can vary the width on a pulse to pulse basis—as military radars do.

I find a surprising result in that the required scanning rate for the solid angle being examined and the round trip time interval for the radiation to proceed from the transmitter, to a target, and return agree closely. The fit between the two scanning rates is surprisingly close, even if we make no adjustment of the beam width. Moreover, agreement can easily be obtained, by a reasonable amount of "beam profiling". If we allow 1.5 seconds (out of the 2 second scanning period) for active use of the radar system, we want to cover $9 \times 10^4$ "looks" in that 1.5 seconds. That allows 22.2 $\mu$sec per look.

We now compare that 22.2 $\mu$sec with the time it takes radar waves to go 5 nautical miles out and back, which is 62 $\mu$sec. The factor of 3 difference between those two numbers, which come from completely different design requirements is surprising and highly desirable. I would have been prepared to cope with a difference of a factor of 1000. So when the factor is only 3, I consider that I have been exceedingly fortunate and the two numbers are in "almost exact agreement".

I must now mention an additional factor that works against me, but only when looking nearly straight ahead. That is that I may then see ground targets that are much farther away, for example 40 or 50 nautical miles. So when I am looking nearly horizontally, I have to cut my pulse repetition frequency (PRF) from the 1/62 $\mu$sec=16 KHz that corresponds to a maximum range of 5 nautical miles, to one tenth of that value—to make sure that some ground clutter does not "come in on the second time around".

I do not have that problem when looking up or down, because I will not turn my lower antenna on until I leave 30,000 ft, which is within 5 nautical miles of the ground. And there is nothing above me except airplanes.

The transmitter necessary for this invention is known in the art. Specifically, and referring to the E. M. Goodell Pat. No. 3,005,194 at FIG. 3 thereof, a suitable transmitter for use with this invention is diagrammatically illustrated. It will be realized that by those skilled in the art that it will be necessary to delete therefrom the divider 20 and the TR switches 21a, 21b. Additionally, the transmitting antenna will have to be modified as set forth herein.

The disclosed range measurement will require a clocking signal fed from the transmitter PRF generator to the receiver, or vice-versa; and if a magnetron is used, it may be necessary to use techniques in the receiver to compensate for pulse-to-pulse frequency shifting of the magnetron.

The millimeter-wave power generator may comprise a conventional magnetron driven by a conventional pulse-forming-network modulator. The waveguide and transmitting horn can be such as used in standard Ka-Band marine radar. For example, that used by the Raytheon Company of Los Angeles, California in their Model 2502 marine radar can be of interest.

The modulator preferably would be a conventional line-type pulse forming network; alternatively one may use a high-power, high-voltage SCR circuit driven by a PRF generator and driving, in turn, a saturable reactor pulse forming network for applying high voltage pulses to the magnetron. One such modulator which could be suitable would be in the Sperry "Seatrach" marine radar.

One apparently suitable magnetron is the Model 35M30/LD505 made by Nippon Electric, Ltd. Alternatively one may use high-power Klystron amplifiers. Since it is easily within ordinary skill to duplex together several klystrons, the peak power and average power of the transmitting subsystem need not be limited by the power capabilities of a single tube. The use of klystrons in the transmitter would have an additional advantage: it would facilitate the use of sophisticated signal processing techniques such as correlation detection and/or doppler techniques for casting out all targets except those having a substantially constant, and closing, range rate.

The design of the two quite different types of radomes (XMTR and RCVR), is much simplified by not only our ability to tolerate a degradation in beam width at the larger azimuths, but actually our desire to so degrade it. FIG. 5 shows schematically a horizontal cut through the receiving array, and its cylindrical radome at the leading edge of the vertical stabilizer or the ventral fin. It will be understood receiving elements are disposed at the focus of a reflector element having a parbolic section normal to the axis of mechanical pan of the system. It is clear that if the dielectric does not cover the whole forward section of the fin, the effective width of the radiator decreases as it looks farther to the left or right. The same feature illustrated in FIG. 5 in the transmitter radome, and those two features make the mechanical construction of the radomes much simpler than it would have been had we wanted to retain the high angular resolution of the radar system at large azimuth angles. The fact that R, the range to the target comes into the radar equation as an inverse 4th power is what makes it possible to throw away antenna gain and area as we look farther to left or right, where the targets much be closer, to be of any concern. As an example of the 4th power law, when a plane is half as far away, it gives a received power 16 times as great as it formerly did.

Even though I speak of "degrading" the performance of the CAS radar system, to gain certain worthwhile objectives, I should point out that if we degrade our antenna system by a factor of 4, horizontally it matches the beam width of a very high class military radar—it is not possible to put a dish much larger than 2 feet in diameter in the nose of a fighter plane; such radars work at the 4 times longer X-band wavelength.

Referring to FIGS. 1a and 1b, comment about the lower phase-scanned array can be made. It will be mounted in the leading edge of a retractable "ventral fin" or fairing, corresponding to the vertical stabilizer on the upper side of the plane. The ventral fin is here shown in front of the nose wheel. The reader will understand that the lower receiving antenna may just as well be located between the main gear and the nose wheel, so its antenna's view would not be cut off by the engines or the flaps, when the antenna is looking in the "overlapping beam area", just above the horizon. The only unusual feature of this arrangement is that the pilot may want to be able to lower the main gear, while the ventral fin is extended and operating. If the pilot lowered everything together, as he now always does—he only has one lever that lowers both main gear and nose wheel—the nose wheel would interfere with the forward looking ability of the lower receiving antenna. So I would suggest that the copilot be given an extra lever, to lower the nose wheel just before touchdown, or whenever he is satisfied that there are no planes below, into which he could collide.

It is fortunate that we want a ventral, rather than a dorsal fin; the jet already has one of the latter kind. There is plenty of room in the baggage compartment in which to stow a ventral fin, but none above the passengers' heads, in which to stow a dorsal fin. It of course is not the purpose to here anticipate just where to the bottom of the jet engineers will decide to locate the fin. They could even place it behind the main gear, and let the microprocessor "clear the lower quadrant" before the landing gear was all lowered at one time.

A few comments can be made concerning the dimensions of the fin. For vertical angular resolution reasons, I have made it 2 meters/cos 40°=2.6 meters long=8.6 feet. For structural and aerodynamical reasons, my guess is that the vane or fairing should have a "chord" of about 4 feet (in the fore and aft direction), and a width of about one foot, to accommodate the 10" width of the receiving antenna. The vane could easily be pushed into position in the airstream, by a hydraulic actuator, and I doubt that it would have a noticeable effect on the flying characteristics of the jet. I note that most business jets could not accommodate such a large vane. These business jets could most probably rely on the vertical staiblizer-mounted antenna for the long range, high angular resolution system, and use a shorter ventral fin for lower quadrant coverage of nearby planes.

The radar system I have described can detect small planes at 5 nautical miles, straight ahead, when they are "close to the ground". The usual radar equation gives the received peak power for a monostatic system, but it works equally well for a bistatic system. From Skolnik's Radar Handbook, pages 1-4, we have $$P_r = \frac{P_t G_t}{4\pi R^2} \times \frac{\sigma}{4\pi R^2} \times A_r,$$

where
- $P_r$ is the received peak power
- $P_t$ is the transmitted peak power
- $R$ is the range
- $\sigma$ is the scattering cross section of the detected object
- $A_r$ is the area of the receiving antenna
- $G_t = 4 A_t/\lambda^2$ is the gain of the transmitting antenna, and $\lambda$ is the wavelength.

(The only change I made in Skolnik's notation is in the definition of $G_t$, which he says is equal to $4\pi/A_r/\lambda^2$; it is obvious that we should use the area of the transmitting antenna to calculate the gain of a bistatic system.)

I will measure powers in watts, and use centimeters to measure $\lambda$ and R, and $cm^2$ to measure $\sigma$.

Let me now repeat the assumed dimensions of the two antennas: the projected area of the receiving antenna is 200 cm×25 cm, and the actual area of the transmitting antenna is about 0.75 cm×60 cm.

Skolnik's Radar Handbook, page 7-55, (FIG. 7), shows the average power of "transmitting tubes" in 1968 to be about 10,000 watts, at 40 GHz. (The corresponding numbers for magnetrons and klystrons at 3 GHz are 1947: 1,000 watts, 1958: 10,000 watts, and 1968" 400,000 watts.) By the power amplifier scheme hereinafter disclosed, it will be possible to have a peak power of more than $10^5$ watts at 40 GHz, and so, at an average duty cycle of 0.3 $\mu$sec/100 $\mu$sec=3×10$^{-3}$, the average transmitter power will be less than 1 kilowatt. I will assume a peak power of $10^5$ watts when calculating by the radar equation.

In military radar design, one has to worry about finding objects (for example ICBM nose cones) that have been purposely designed to have a very small scattering cross section, to make them hard to see. But for the small planes that concern us, we can use the numbers from the MIT Radiation Laboratory Series, which was written assuming normal radar cross sections. In Volume 1, page 22, in the discussion of the radar equation, it says "$\sigma$=100 ft$^2$ (typical for small aircraft)". So I will use $\sigma=9\times10^4$ cm$^2$ in my calculations. Now, with R=5 nautical miles=9×10$^5$ cm, we have $$P_r = \frac{10^5 \times 0.75 \times 60}{(0.75)^2 (9 \times 10^5)^2} \times \frac{9 \times 10^4}{12.5 \times (9 \times 10^5)^2} \times 200 \times 25$$
$$P_r = 4.39 \times 10^{-10} \text{ watts}$$

In a "perfect receiver", the noise is
kt$\Delta$f, where kT at 300° K. is 4.14×10$^{-21}$ watts per Hz.

With the assumed 0.3 usec pulse width, the bandwidth must be about 1/$\Delta$t=3.33 MHz.

So the noise in a 300° K. receiver would be N=4.14×10$^{-21}$×3.33×10$^6$=1.38×10$^{-14}$ watts.

We can therefore detect our "small plane" at 5 nautical miles, with S/N=1, if our receiver is 4.39×10$^{-10}$/1.38×10$^{-14}$=3.18×10$^4$ times worse than "ideal". So we could tolerate a receiver with a 45 db noise figure, and have S/N=1.

It can be seen from this analysis that the radar system will do the job it is intended to do.

I spoke earlier of seeing planes 5 nautical miles ahead, when they were "close to the ground". I'll now calculate the height, width, and length of the volume searched by one radar pulse at 5 nautical miles.

$\Delta$h=5×6072 ft×0.2°/57=106 ft $\Delta$w=5×6072 ft×0.71°/57=378 ft $\Delta$R=C t/2×0.5×10$^2$ft/sec×0.33 usec=165 ft So the "box" that is searched at any one time (at 5 nautical miles) is 106 ft high, 378 ft wide, and 165 ft long. (The first two numbers are of course proportional to the range.) In practice, the antennas will have sidelobes, so the first two of these numbers will be appreciably larger than tabulated. But I believe that in practice, this radar will detect and evaluate the threat of all planes that could possibly collide with the jet that carries it.

Using the parameter of constant bearing, closing range to examine collision candidates, transformation of coordinates from the upper 40° tilted quadrant and the lower 40° tilted coordinate to a single coordinate system is not absolutely required. Nevertheless, the desirability of such a transformation warrants discussion. We have our XMTR and RCVR antennas tilted back 40°, but want to make our observations in elevation angle and azimuth angle. But in fact we want to make our observations in an "alt-azimuth system" (latitude and longitude), attached to the frame of the jet—or perhaps to the local vertical; those two coordinate systems are almost the same.

We have defined out search solid angle to be the upper and lower forward quadrant. So if our receiving antenna were vertical, we would simply search all elevation (latitude) angles from −5° to +90°, and all azimuth (longitude) angles from −90° to +90°. The transmitting antenna would in that case rotate about a vertical axis, and "point up" at about 30° to the horizontal. It would illuminate the narrow band of longitudinal ($\Delta\phi\approx$0.71°), from well below the horizon to beyond the "north pole". As it scanned, mechanically, from $\phi = -90°$ to $\phi = +90°$, the receiving antenna would follow it, and everything would work out in a very simple manner.

But with the receiving antenna tilted back about 40°, and the transmitting antenna rotating about a "polar axis" (of an equatorial mounting) tilted back by that same amount, things get a bit more complicated, (but easy for a microprocessor to handle in real time).

In FIG. 6a, two spherical coordinate systems are lined up with its polar axis vertical, and the other with that axis tilted back 40° from the vertical. FIG. 6b shows roughly (in a pseudo mercator projection) the upper quadrant (plus a 5° overlap in elevation below the horizon) as it "maps" onto the tilted coordinate system in which the scanning is done. I believe that FIGS. 6a and 6b tell all one needs to know about the coordinates in which the scanning is done, and how they relate to the "alt-azimuth" system in which one normally thinks. Standard computer programs are available for producing desired coordinate transform systems.

I will now say something about the antenna I have in mind. It is obviously true that I could have interchanged the role of receiving and transmitting antennas with no loss in maximum detection range, or angular resolution, and that may turn out to be the best way, when solid state microwave amplifiers (or even oscillators) give enough power that they could be used as the phased radiating elements on the two 2.6 meter "vertical" arrays. But as of 1978, the peak output power of individual IMPATT oscillators in the 40 GHz band seems to be less than 1 watt. If the radiating elements were the usual half wavelength apart, there would be $2 \times 260/0.75 = 693$ of them in the 2.6 meter length of the antenna.

I prefer to place the elements 0.75λ apart, where there are still no problems with "grating lobes". Under those conditions, there are only 462 elements in each array.

The peak transmitted power would be less than half a kilowatt, which is much less than what can be obtained from "tube" generators. The individual 40 GHz phase shifters are difficult to build, and take a lot of power to operate. So all in all, I believe it is better to use a high-power transmitting tube, such as a magnetron and feed it to a simple mechanically rotated radiator, without worrying about phasing problems.

Some attention may now be devoted to the "receive-only array". The main advantage to be gained in using a receive-only phase array is that the phase shifting does not have to be done at the microwave frequency, but can instead be done at the much lower intermediate frequency (IF), where lumped constant circuits can be used. Low frequency circuits are known having a fixed capacitor in series with a variable resistor can shift the phase of a signal by almost 180°, in a continuous fashion. So by locating a mixer at each one of the approximately 500 receiving elements along each of the two long arrays—assuming 0.56 cm spacing—we would get 500 IF signals that could be added to form the composite IF signal. If all the mixers were fed from a single local oscillator (L.O.), or equivalent, the direction in which the receiving beam was "looking" would be determined by the IF phase shift introduced between each mixer output, and the "IF line", to which all the IF signals were fed. Unfortunately, microwave integrated circuits at 40 GHz are almost non-existent, and certainly very expensive, as well as noisy. By contrast mixers are relatively inexpensive. Stripline mixers at about 90 GHz have been fabricated on a substrate, with 50 such devices made in a single operation, side by side. The individual units are split apart, and fitted with a pair of diodes, to make relatively low noise balanced mixers. It appears the most inexpensive and low noise component one could buy in lots of 500 per antenna, is a mixer.

Referring to FIG. 5, each receiving component comprises elements $R_1-R_6$. These elements $R_1-R_6$ include insulating substrates with a metallic dipole antenna deposited on its surface. A corresponding balanced mixer $M_1-M_6$ is preferably fabricated at the same time, and properly connected to each antenna element. Each antenna element has an overall length of $\lambda/2 = 0.375$ cm $= 0.148$ inch. Each mixer $M_1-M_6$ is connected to the L.O. line through switches $S_1-S_6$ to $S_N$. Proper phase is selected by the phase scan processor 45. The advantage of doing the amplification at IF is at once obvious, because IC technology is so far advanced over microwave IC (MIC) technology—particularly when we compare 30 or 60 MHz to 40 GHz. IC IF amplifiers are now so inexpensive that it is reasonable to have 500 of them in a vertical array. It is quite probable that several neighboring individual antennas can be connected in parallel and always operating in phase with each other; in this way, the number of mixers and IF amplifiers would be decreased by n, where n is the number of "commonly phased" neighbors. The quality of the beam is degraded in this mode when the beam points farther away from the normal to the antenna, but such a cost-saving design feature is worth noting.

The local oscillator 40 is signal communicated to a phase shift network 42. Each of the six outputs from the phase shift network has a phase difference of 60° and is communicated in parallel to switches $S_1-S_6$ to $S_N$ along with the output of microprocessor controlled phase scan processor 45.

The microprocessor control serves to phase scan in the vertical direction by switching the phased local oscillator signal supplied to each element. The result is that dependent upon the phase of the local oscillator fed to the mixer $M_1-M_6$, the angular sensitivity of the phased array of elements $R_1-R_6$ is tuned.

One of the reasons for having many IF amplifiers is that I would like to have each such amplifier feed a set of RC phase shifting elements. Without amplification, there would be a loss of IF signal power, and therefore loss in range, because the signal would be shared in the several RC phase shifters. So my present suggestion would be to have perhaps 6 possible phases always available from each IF amplifier, with a "rotating switch" to connect the appropriately phased IF output to the common IF line. The switches would be controlled by the microprocessor, to make the receiving fan beam point at the desired elevation angle. I chose 6 equally spaced phases—60° apart—because the literature on phased arrays shows that with larger "quantized steps" in phase, the performance of the array is degraded. The article in Microwaves on phased arrays at 16.5 GHz (mentioned earlier) used a "two bit" phase shifter, with 4 possible values, spaced 90° in phase. The author of that article considered the performance satisfactory, and not sufficiently degraded to go to a 3-bit phase shifter—45° between allowed phases. So a 60° quantization is probably reasonable, and certainly inexpensive enough—ordinary capacitors and resistors are small enough and cheap enough to use in this manner—one does not have to go to IC techniques to fabricate the fixed phase shifters, but perhaps that is a straightforward thing to do after all.

I have now covered all of the main features of the CAS system, except for the microprocessor that will analyze the signals, and if necessary, alert the pilot and tell him what to do. Such an analysis of radar signals by a computer is such a standard operation in both the civilian and military fields it will be set forth only by reference here.

The receiver scanner illustrated in block diagram of FIG. 5 will comprise an elongated array of about 500 microwave-integrated-circuit doubly balanced mixers spaced at about ⅜" intervals along the length of an insulating substrate. I presently visualize that the same substrate might carry the receiving dipoles in the form of a printed circuit having conductive lines extending from each dipole to its associated mixer. The IF buss will preferably be printed on the same substrate.

The feeding of separate LO signals to their respective mixers will require a strip-line structure, or an equivalent.

The superheterodyne receiver associated may be completely conventional, at least to the output of the second detector. Thus it will be understood that a conventional superheterodyne radar receiver is all that is required. It may be necessary to provide for de-sensitizing the receiver during each transmitting pulse, as is common in the art.

Target selection can be implemented by a bearing-angle monitoring, and/or range-rate monitoring utilizing a conventional microprocessor. Collision predicting circuits are disclosed in Goodell et al U.S. Pat. No. 3,005,194. Additionally, several frame-to-frame correlation schemes exist that can be used.

It will be understood that in displaying the disclosed information to a pilot, many display systems can be used. It is emphasized here by ignoring those signals which do not comprise collision candidates, the pilot will be provided with information on a need to know basis only.

It will be understood that it is contemplated in this invention to alert the pilot by means of visual, audio or tactile alarms. Simultaneously, one could initiate a video or digital display of the range, range rate, and bearings of the collision-threat airplane.

It will be understood that modification may be made to this invention and all that is set forth herein.

I claim:

1. In an aircraft-carried collision avoidance system for providing warning of potential collision with other craft or objects, the combination of:
   (a) first radar means including a millimeter-wavelength transmitter carried by an aircraft for transmitting, forwardly of said aircraft, a train of time-spaced radiation pulses;
   (b) second radar means including a millimeter-wavelength receiver including a receive-only phased array antenna;
   one of said radar means having a first left-right mechanically scanned antenna with a substantially vertically oriented beam having a horizontal-plane beam width of the order of one degree and a relatively very large vertical beam width;
   the other of said radar means having a second synchronized left-right mechanically scanned antenna and having an antenna pattern beam width of about one degree in the horizontal plane and a much narrower beam in the vertical plane and with said pattern being electronically scannable through a vertical angle whereby the pencil beam formed by the overlap of the receiver and transmitter pattern scan a segment of the forward direction of said aircraft;
   (c) means for using said output signals to evaluate the threat of potential collision.

2. The system of claim 1 wherein said one of said radar means includes the transmitter.

3. A system in accordance with claim 1, wherein said other of said radar means includes a receive-only antenna, said antenna comprising:
   (a) an elongated dielectric substrate,
   (b) a large plurality of metallic dipole elements disposed on said substrate and spaced apart along the length thereof;
   (c) a plurality of integrated-circuit mixers spaced apart along the length of said substrate with one input port of each mixer being coupled to at least one of said dipoles;
   (d) IF circuit means for deriving IF signals from said mixers and feeding the same, in common, to an IF amplifier;
   (e) LO circuit means for providing LO signal to said mixers; and
   (f) phase-shifting means associated with either said IF circuit means or said LO circuit means for effectively controlling the relative phases of the IF signals received by the IF amplifier from the various receiving dipoles in a manner such that the sensitivity pattern of the receive-only antenna is repetitively scanned through an elevation angle of at least about 45 degrees.

4. The system of claim 1 wherein said receiver is disposed in the leading edge of a vertical stabilizer, said vertical stabilizer having a dielectric leading edge transparent to received radiation, a reflector for focusing said received radiation, and dipole elements on said receiver disposed towards said reflector for receiving said radiation.

5. In an aircraft-carried, microwave-radar collision avoidance system, the subcombination comprising:
   (a) an elongated, dielectric member extending within a plane that is substantially normal to the plane of the wings of said aircraft,
   (b) an antenna array comprising a plurality of uniformly spaced dipoles spaced apart along said dielectric member by not more than the free space wavelength at the frequency of operation for separately producing microwave potentials indicative of the relative times of arrival at said elements of pulsed microwave-frequency waves that may be transmitted to said member,
   (c) a plurality of microwave-integrated circuit mixers spaced apart longitudinally of said member with one signal input of each mixer being coupled to at least one of said antenna elements,
   (d) circuit means for feeding local oscillator signal to a second signal input of each mixer,
   (e) phase-shifting means for controlling and varying the relative phases of the local oscillator signals applied separately to the several mixers,
   (f) means electrically associated with said phase shifting means for continuously providing information as to the angular direction, relative to said dielectric member, of the directional sensitivity pattern of said array; and, (g) means for mechanically scanning said array in a direction orthogonal to said directional sensitivity pattern of said array whereby said array is mechanically scanned in a first angular direction and electronically scanned in a second angular direction.

6. The system of claim 5 and wherein said antenna array is disposed at the leading edge of a vertical stabilizer on said aircraft.

7. The system of claim 5 and wherein said antenna array includes first and second antennae arrays, one of said array being on the upper side of said aircraft on the leading edge of a vertical stabilizer and the other of said antennae arrays is lower from below said aircraft.

8. A receive-only phased-array antenna system having an angularly variable directional sensitivity characteristic, said system comprising:
   (a) an elongated support member having a length of at least one hundred free-space wavelengths at the intended frequency of operation;
   (b) means for mechanically scanning said support member about an axis substantially parallel to the axis of said support member;
   (c) a large plurality of microwave receiving elements uniformly spaced apart along said member by not more than a few free-space wavelengths at the frequency of operation, with each of said elements including:
      (i) an insulate substrate,
      (ii) a conductive dipole disposed thereon, and
      (iii) a stripline balanced mixer formed by deposition of a conductive material on the surface of said substrate;
   (d) means for feeding local oscillator signal to each of said mixers;
   (e) means for deriving IF signal from each of said mixers; and
   (f) control means for variably controlling the direction of maximum sensitivity of said array, said control means comprising a plurality of phase-shifting elements with one such element serially connected either between each mixer and the local oscillator signal source or between each mixer and a common IF signal output conductor.

9. The receive only phased-array antenna of claim 8 wherein said conductive dipole and stripline balanced mixer are formed from vapor deposited metal.

10. A process for collision avoidance between a first aircraft and a second aircraft wherein said first aircraft flies at a speed at least 44 knots in excess of the speed of said second aircraft; said process comprising the steps of: providing said first high-speed aircraft only with a millimeter wavelength transmitter; sweeping the forward hemisphere of travel of said first aircraft from said transmitter with a plane of time spaced radiation pulses in a substantially vertically oriented beam having a horizontal-plane beam width of the order of 1° and a relatively very large vertical beam width; providing said first aircraft only with a millimeter wavelength receiver, including a receive-only phased array antenna having an antenna pattern beam of less than 1° in the vertical plane; sweeping said pattern electronically an elevation and panning said beam mechanically in azimuth; this said pattern as swept and panned covering at least a forward quadrant of airplane travel; producing output signal representative of only second aircraft that have angular locations within the forward hemisphere relative to the longitudinal axis of the path of travel of said first aircraft and that are closing in range, and have a substantially constant relative bearing over a period of time corresponding to a few receiving antenna scan cycles; and, informing said pilot of said video processed signals only.

* * * * *